(12) United States Patent
Rice et al.

(10) Patent No.: US 10,775,956 B2
(45) Date of Patent: Sep. 15, 2020

(54) ELECTRONIC DATA STORAGE RE-SHARING NOTIFICATION

(71) Applicant: Microsoft Technology Licensing, LLC, Redmond, WA (US)

(72) Inventors: Stephen L. Rice, Redmond, WA (US); Ghania A. Moussa, Snohomish, WA (US); Sarat Subramaniam, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 777 days.

(21) Appl. No.: 15/142,443

(22) Filed: Apr. 29, 2016

(65) Prior Publication Data

US 2017/0315677 A1 Nov. 2, 2017

(51) Int. Cl.
| | | |
|---|---|---|
| *G06F 3/0481* | (2013.01) | |
| *G06F 16/176* | (2019.01) | |
| *H04L 12/58* | (2006.01) | |
| *H04L 29/08* | (2006.01) | |

(52) U.S. Cl.
CPC .......... *G06F 3/0481* (2013.01); *G06F 16/176* (2019.01); *H04L 51/24* (2013.01); *H04L 51/36* (2013.01); *H04L 67/06* (2013.01)

(58) Field of Classification Search
CPC ............. G06F 3/0481; G06F 17/30165; G06F 21/6218; G06F 16/176; H04L 67/06; H04L 51/18; H04L 51/24; H04L 51/36; H04L 63/104; H04L 63/20; G06Q 10/107
See application file for complete search history.

(56) References Cited

U.S. PATENT DOCUMENTS

| | | |
|---|---|---|
| 5,623,655 A | 4/1997 | Chisaka |
| 6,877,136 B2 | 4/2005 | Bess et al. |
| 8,453,052 B1 | 5/2013 | Newman et al. |
| 2004/0193678 A1 | 9/2004 | Trufinescu et al. |
| 2006/0085245 A1 | 4/2006 | Takatsuka et al. |

(Continued)

FOREIGN PATENT DOCUMENTS

| | | |
|---|---|---|
| EP | 2 154 819 A1 | 2/2010 |
| WO | 2013070684 A1 | 5/2013 |

OTHER PUBLICATIONS

Lexico Dictionary, "cancel", URL: https://www.lexico.com/en/definition/cancel, p. 1-2 (Year: 2019).*

(Continued)

*Primary Examiner* — Ajay M Bhatia
*Assistant Examiner* — Mong-Shune Chung
(74) *Attorney, Agent, or Firm* — Christopher R. Christenson; Kelly, Holt & Christenson PLLC

(57) ABSTRACT

A computing system providing access to electronic files is provided. The computing system includes a processor and a data store coupled to the processor and configured to store the electronic files. A user interface component is coupled to the processor and is configured to generate a user interface that allows a first user to select an electronic file to be re-shared with second user. The processor is configured to detect re-sharing of the selected electronic file by the first user and automatically generate a notification to a third user. The notification is configured to allow the third user to cancel the re-sharing of the electronic file.

14 Claims, 12 Drawing Sheets

(56) References Cited

U.S. PATENT DOCUMENTS

| | | | |
|---|---|---|---|
| 2006/0123084 A1 | 6/2006 | Heidloff et al. | |
| 2007/0100986 A1 | 5/2007 | Bagley et al. | |
| 2011/0078197 A1* | 3/2011 | Zurko ............... | G06F 17/30165 |
| | | | 707/783 |
| 2012/0192086 A1 | 7/2012 | Ghods et al. | |
| 2012/0284345 A1* | 11/2012 | Costenaro ............ | G06Q 10/107 |
| | | | 709/206 |
| 2013/0318589 A1 | 11/2013 | Ford et al. | |
| 2014/0215551 A1 | 7/2014 | Allain et al. | |

OTHER PUBLICATIONS

Thesaurus, "cancel", URL: https://www.thesaurus.com/browse/cancel, p. 1-3 (Year: 2013).*

International Search Report and Written Opinion for International Patent Application No. PCT/US2017/029037, dated Jul. 5, 2017, date of filing: Apr. 24, 2017, 14 pages.

"Organized and efficient data sharing", Published on: Apr. 4, 2013 Available at: http://www.collatebox.com/web/tour.html.

"Share sites or documents with people outside your organization", Retrieved on: Apr. 12, 2016 Available at: https://support.office.com/en-gb/article/Share-sites-or-documents-with-people-outside-your-organization-80e49744-e30f-44db-8d51-16661b1d4232.

Mary, "Notifications in a spreadsheet", Retrieved on: Apr. 12, 2016 Available at: https://support.google.com/docs/answer/91588?hl=en&rd=1.

* cited by examiner

ELECTRONIC DATA STORAGE RE-SHARING NOTIFICATION

BACKGROUND

Storage of electronic files, such as documents, photos, spreadsheets, presentations, videos, songs, and more is virtually a necessity in modern times. Centralized storage of and access to such files in a network-accessible manner allows the files to be accessed and maintained easily and effectively from a variety of network-connected devices. One form of such storage is an on-line storage platform that is accessible over the Internet and allows users and/or organizations to create accounts with the on-line storage provider in order to securely upload, access, edit, and delete such electronic files.

With the digital storage of electronic files, it is easy to share such files with others in order to collaborate on a document or review vacation photos. When a user is accessing and sharing electronic files, such as a list of clients for the organization, the user is typically aware of whether the electronic file contains sensitive material and will share or not share the electronic file(s) accordingly. However, in organizations where a particular user may not understand the sensitivity of a particular electronic file to the organization, it is possible for such electronic files to be shared that may allow competitors of the organization to view sensitive organizational documents that would damage the organization's competitive advantage or otherwise harm the organization. Further, once such an electronic file is accessed by an improper recipient of a share, control to the electronic file is likely lost and it may be disseminated in a manner beyond the organization's control.

The discussion above is merely provided for general background information and is not intended to be used as an aid in determining the scope of the claimed subject matter.

SUMMARY

A computing system providing access to electronic files is provided. The computing system includes a processor and a data store coupled to the processor and configured to store the electronic files. A user interface component is coupled to the processor and is configured to generate a user interface that allows a first user to select an electronic file to be re-shared with second user. The processor is configured to detect re-sharing of the selected electronic file by the first user and automatically generate a notification to a third user who owns the electronic file or is responsible for it. The notification is configured to allow the third user to cancel the re-sharing of the electronic file.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
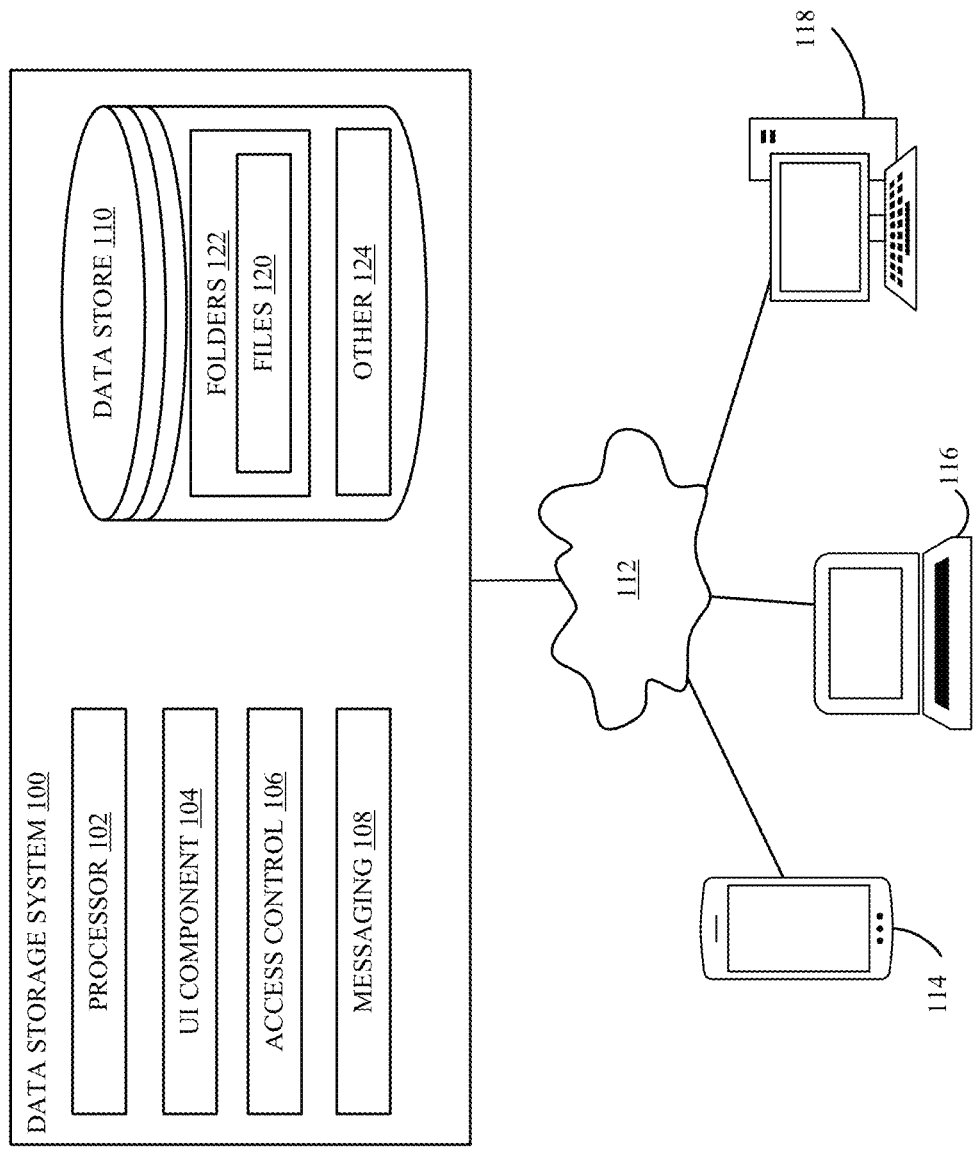
FIG. 1 is a diagrammatic view of a network-accessible data storage system with which embodiments described herein are particularly useful.

When an electronic file has been shared with a first user, and that first user re-shares the electronic file with a second user, it generally takes a certain amount of time for the invitation for the re-shared file to be transmitted to, received by, read, and acted upon by the second user. Once the second user accepts the re-share invitation, the second user will have access to the electronic file. Embodiments described herein generally leverage the rapid ability of electronic systems to detect such re-sharing activity and provide one or more suitable notifications to an owner of the electronic file, or other responsible party, in such a timely manner that the owner or responsible party can act upon the re-share often, before the re-share invitation is even read by the second user. This allows the file owner or responsible party to revoke access or otherwise cancel the re-share operation to the second user thereby increasing the security of the electronic file.

While embodiments described herein generally have wide applicability to any electronic system that is able to store electronic files and allow multiple users to selectively access such electronic files, the remainder of this description will be described with respect to an on-line data storage system that is accessible over the Internet. This embodiment is considered a cloud computing embodiment.

Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of the architecture as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

FIG. 1 is a diagrammatic view of an on-line data storage system with which embodiments described herein are particularly useful. Data storage system 100 includes processor 102, user interface (UI) component 104, access control component 106, messaging component 108, and data store 110. Additionally, while not specifically shown in FIG. 1, data provider 100 includes suitable circuitry or other arrangements to enable data storage provider 100 to connect to network 112 in order to provide access to devices 114, 116, and 118. While network 112 may be any suitable network, such as a local area network, embodiments described herein are particularly applicable when network 112 is a wide area network, such as the Internet.

Processor 102 is illustratively a computer processor that has associated memory and timing circuitry, not separately shown. Processor 102 is illustratively a functional part of data storage provider 100 and facilitates the functionality of data storage provider 100 in providing access to data in data store 110.

UI component 104 is illustratively controlled by other components, servers, or items in data storage provider 100 in order to generate user interface displays for users using devices 114, 116, and 118. Devices 114, 116, and 118 are merely provided as examples of various user devices that may be used to interact with system 100. In the illustrated example, device 114 is a mobile device, such as a smartphone; device 116 is a laptop or notebook computer; and device 118 is a desktop computer. It will be noted, however, there can also be a user interface component on devices 114, 116, and 118 which generate those user interface displays as well. Further, it will be noted that user interface component 104 can generate the user interface displays itself, or under the control of other items shown in FIG. 1.

The user interface displays illustratively include user input mechanisms that allow the users to control and manipulate data storage provider 100, in order to upload, access, share, and manage electronic files stored within data store 110. The user input mechanisms can include a wide variety of different types of user input mechanisms, such as links, icons, buttons, drop down menus, text boxes, check boxes, etc. In addition, the user input mechanisms can be actuated by the user in a wide variety of different ways. For instance, they can be actuated using touch gestures (where the display is touch sensitive), a hard or soft keyboard or keypad, a point and click device (such as a mouse or trackball), buttons, joysticks, or other actuators. Additionally, where data storage provider 100 or one of devices 114, 116, and 118 has speech recognition components, the user input mechanisms can also be actuated by using voice commands.

Access control component 106 may employ an access control list or other suitable structure that includes information that indicates permissions or access rights for each user or group of users that are able to use data storage provider 100. Additionally, access control component 106 may maintain a list of authorized users for each organization or tenant for which data storage provider 100 provides data storage services. Accordingly, a list of users within the organization will be maintained by access control component 106, thereby allowing access control component 106 to identify other users (outside of the organization) as any user who is not listed as a member of the particular organization. Such users are considered to be external users. Sharing electronics files with external users can be a security risk for an organization, and should be carefully controlled.

Messaging component 108 may include a messaging server or other suitable device or logic that is able to compose and/or send messages to users. Accordingly, messaging component 108 may include an e-mail server that supports the known Simple Mail Transfer Protocol (SMTP). However, messaging component 108 may also include an instant messaging server (SMS) or any other device or logic that is able to provide messages to users. Further still, in embodiments where access to data storage provider 100 is provided to one or more of devices 114, 116, and 118 via an application executing upon said devices. Messaging component 108 may include code and/or suitable circuitry to surface such messages or notifications within the application executing upon such user devices.

Data store 110 is shown as a single data store that is local to data storage provider 100. However, it will be noted that data store 110, in actuality, may be comprised of a number of different data stores, all of which may be local to data storage provider 100, some of which may be local to data storage provider 100, or all of which may be remote therefrom. Data store 110 illustratively stores a number of electronic files 120 within folders 122. However, other forms of data 124 may also be stored by data store 110 and made available by data storage provider 100 for access by users.

Figure 2:
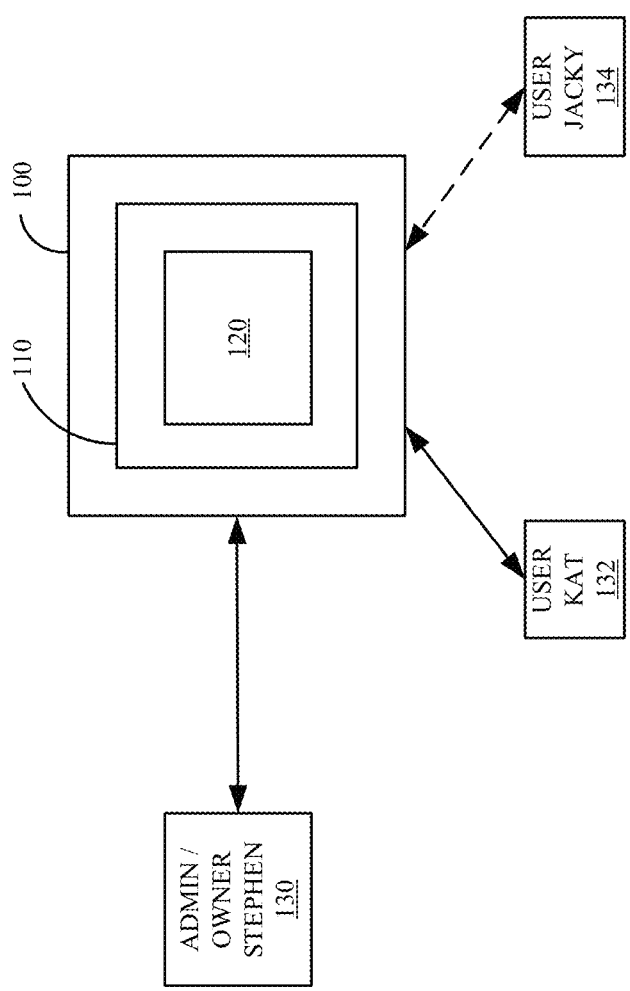
FIG. 2 is a diagrammatic view of multiple users interacting with a data storage system in accordance with embodiments described herein.

FIG. 2 is a diagrammatic view illustrating interactions of multiple users with respect to data storage provider 100 in order to illustrate sharing and re-sharing of an electronic file. As shown in FIG. 2, electronic file 120 is maintained within data store 110. The administrator or responsible party for electronic file 120 is illustrated as user 130 having administrative privileges, named Stephen. Stephen may be the user who authored and/or uploaded file 120 to electronic data storage provider 100 originally (e.g. the owner of file 120), or Stephen may be the administrator or responsible party for electronic file security for all of the organization.

User 130 has decided to share file 120 with user 132, named Kat. In one embodiment, this sharing of electronic file 120 with user 132 is effected by user 130 interacting with suitable user interfaces provided by data storage provider 100 to select the particular file, identify user 132, and authorize the share. In one embodiment, data storage provider 100 will compose an e-mail, or other suitable electronic notification to user 132 containing an invitation to share document 120. User 132 can then accept the invitation and will then have access to document 120. However, other suitable techniques can be used for allowing user 130 to share document 120 with user 132. Specifically, user 130 could interact with access control component 106 directly and edit an access control list to specifically allow user 132 to have access to document 120. An advantage provided by an invitation is that user 132 is notified of the invitation and can affirmatively accept the invitation and subsequently have access to file 120. The sharing of file 120 from an owner or administrator directly to a user is defined herein as a first-level share. All first-level shares are generated by the file owner or responsible party, directly. When a user who has received access to a file via a first-level share subsequently shares the file with another user, that operation, as defined herein, is a re-share operation and is considered a second-level share.

User 132, Kat, may wish to share file 120 with another user, such as user 134, Jacky. In order to do this, user 132 interacts with one or more user interfaces provided by user interface component 104 to select the electronic file and identify Jacky as the user to which document 120 will be shared with. As set forth above, in one embodiment, data storage provider 100 will automatically compose an electronic notification to user 134 in the form of an e-mail or other suitable message that contains an invitation to share file 120. In one embodiment, this invitation is provided within the electronic message as a link that can be actuated by user 134 in order to accept the invitation and/or otherwise access file 120. If user 134 does not accept the invitation, user 134 is not able to access file 120.

Figure 3:
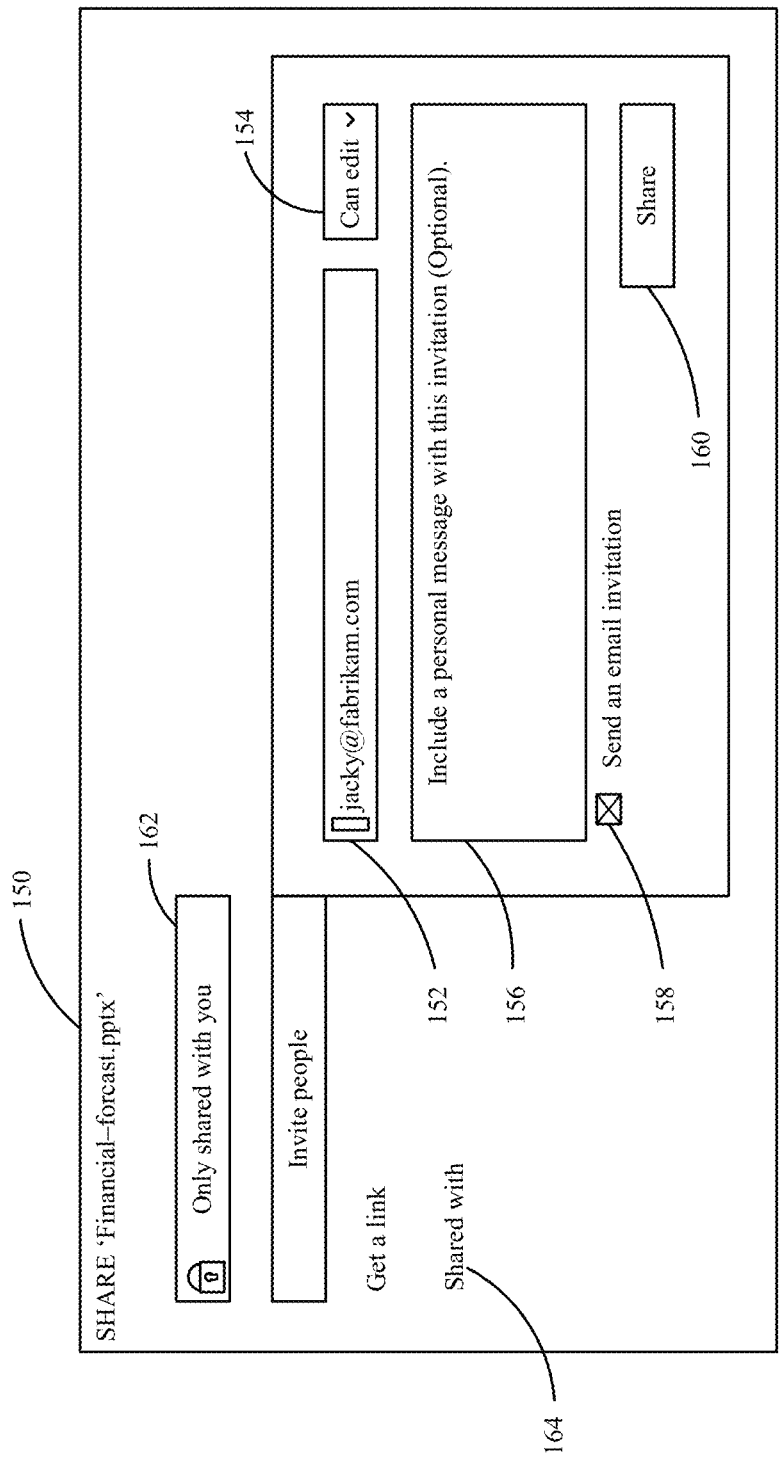
FIG. 3 is a diagrammatic view of a user interface screen where a user is preparing to share a document stored in an on-line data storage system in accordance with an embodiment.

FIG. 3 is a diagrammatic view of a user interface provided to by user interface component 104 of data storage provider 100 to allow the user to share a file. In the example illustrated in FIG. 3, the electronic file is a document entitled Financial-forecast.pptx. User interface 150 may be generated in response to a user clicking on or otherwise selecting a file within data store 110 and indicating or requesting sharing of the selected file. In response, user interface 150 is automatically populated with the name of the selected file and provides a recipient field 152 that allows the user to identify one or more users with which the selected document will be shared. In the example illustrated in FIG. 3, the users are identified by their e-mail address. However, it is expressly contemplated that other forms of identification can be provided. Further still, it is also expressly contemplated that groups of users may be set forth in recipient field 152. Additionally, user interface 150 includes rights selector user interface component 154 that allows the user to select the rights that the recipient(s) will have to the shared file. In the example shown, Jacky@Fabrikam.com will have the ability to edit Financial-forecast.pptx. User interface 150 also includes an optional message field 156 that allows the user to provide a message to the recipient(s) of the invitation in order to potentially explain why the document is being shared or provide other instructions. In the example shown in FIG. 3, a check box or other suitable user interface component 158 is available for the user to select whether the invitation will be sent to the one or more recipients as an e-mail invitation. In the example, the user has selected that the invitation will be sent via e-mail. Accordingly, messaging system 108 of data storage provider 100 will compose an e-mail to jacky@fabrikam.com containing an invitation to share Financial-forecast.pptx. Once the user has suitably configured the sharing of Financial-forecast.pptx, the user can confirm the sharing by selecting share button 160. When button 160 is selected, the one or more electronic notifications are sent to the recipients inviting them to receive access to the selected file. Additionally, user interface 150 includes an alert 162 that notifies the user that the file is only shared with the user. This may alert the user to the fact that the file may contain potentially sensitive or at least not widely disclosed information. Additionally, user interface 150 also includes a user interface component 164 that, when actuated, allows the user to see other users with whom the file has been shared.

When the user selects share confirmation button 160, the various e-mail invitations will be provided by messaging component 108 to the selected recipients. Accordingly, processor 102 detect such re-sharing and engage messaging component 108 to additionally send a notification (via any suitable route or modality), to the owner or other responsible party (user 130) of the electronic file. In one embodiment, upon detecting the share operation, processor 102 will first check to see person sharing the electronic file is the owner or responsible party for the electronic file. If the sharer is not the file owner, or responsible party, processor 102 will causing messaging system 108 to compose and transmit an electronic notification to the file owner or responsible party containing the name of the electronic file, identification of one or more recipients, and any other suitable information that may be of interest to the file owner or responsible party.

In one embodiment, the notification to the owner/responsible party relative to the re-sharing operation is generated and send at substantially the same time as the electronic re-share invitation. However, embodiments are expressly contemplated where the electronic invitation communications are held for a short period (for example five minutes) in order to allow the re-sharing notification to reach the owner/responsible party and potentially be acted upon. In such embodiment, if the re-sharing operation is cancelled or revoked by the owner/responsible party before expiration of the short period of time, then the electronic invitation can be cancelled as a result of the re-sharing revocation.

Figure 4:
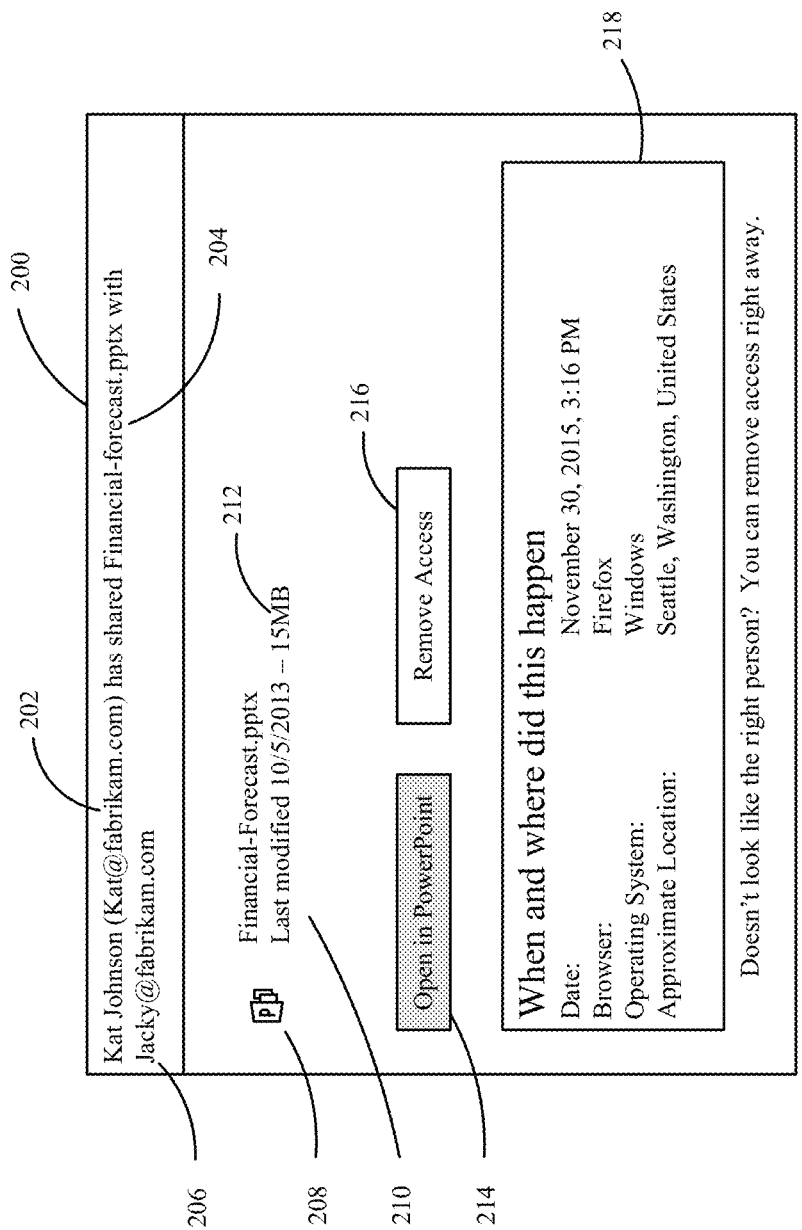
FIG. 4 is a diagrammatic view of a computer screen illustrating a notification generated in response to the share operation illustrated in FIG. 3.

FIG. 4 is a diagrammatic view of a notification provided by data storage system 100 to an owner/responsible party relative to a re-sharing of an electronic file in accordance with one embodiment. Notification 200 includes an identification of the re-sharing party/user (kat@fabrikam.com) as indicated at reference numeral 202, an indication of the re-shared electronic file (Financial-forecast.pptx) as indicated at reference numeral 204 as well as an indication of the recipient(s) of the re-share invitation as jacky@fabrikam.com, indicated at reference numeral 206. Additionally, notification 200 provides a summary display of the electronic file including an icon 208 based on file type, date of last modification 210, and file size 212.

In one embodiment, notification 200 also includes one or more user interface components or features that allow the owner/responsible party to take action relative to the file and/or re-share. For example, based upon the file type, notification 200 includes a user interface element (button 214) that allows the user to open or otherwise access the file in a suitable application. It may be that the owner/responsible party needs to review the contents of the re-shared file in order to determine the propriety of the re-share. If the owner/responsible party wishes to immediately remove access provided by the re-sharing operation, the user can select user interface component 216 which, in one embodiment, may follow or otherwise engage a customized link provided by messaging system 108 in the notification 200 to notify access control component 106 that access provided by the re-sharing of Financial-forecast.pptx by Kat Johnson should be removed. Accordingly, access control component 106 will remove such access by updating an access control list or performing some other suitable access control operation. Thereafter, if the recipient of the re-share should attempt to accept the invitation, access will still be denied. In one embodiment, if the recipient of an invitation relative to re-sharing accesses or otherwise accepts the invitation and the invitation has been cancelled or otherwise removed, the recipient of the invitation may be provided with a notification as such.

Notification 200 also includes, in one embodiment, context portion 218 that provides the owner/responsible party with additional information regarding the re-share. Specifically, context portion 218 provides information regarding when and where the re-sharing operation (generated by Kat Johnson) occurred. In the example shown in FIG. 4, the re-sharing of Financial-forecast.pptx by Kat Johnson occurred on Nov. 30, 2015 at 8:43 pm. Further still, notification 200 also includes information regarding the computing environment of Kat Johnson when the re-share operation occurred. Specifically, context portion 218 indicates that Kat Johnson was using a browser entitled "Firefox" and using the "Windows" operating system. Further still, the approximate location of Kat Johnson during the operation is provided as Seattle, Wash., United States. This approximate location may be provided by analyzing the IP address of the computing system of Kat Johnson, or other suitable techniques.

As set forth above, when the recipient of the re-share invitation accepts the invitation, such as by clicking on a "accept" link or other structure or control in the e-mail notification, access control component 106 will be updated to grant access to the recipient of the re-share invitation (Jacky), unless access has been previously revoked by the owner/responsible party as set forth above. When a re-sharing invitation is accepted, processor 102 will detect such acceptance and/or the update of the information in the access control component 106 and automatically generate a notification to the owner or responsible party relative to the re-shared electronic file via messaging component 108. In one example, the message is provided in the form of an e-mail to the responsible party or owner (Stephen).

Figure 5:
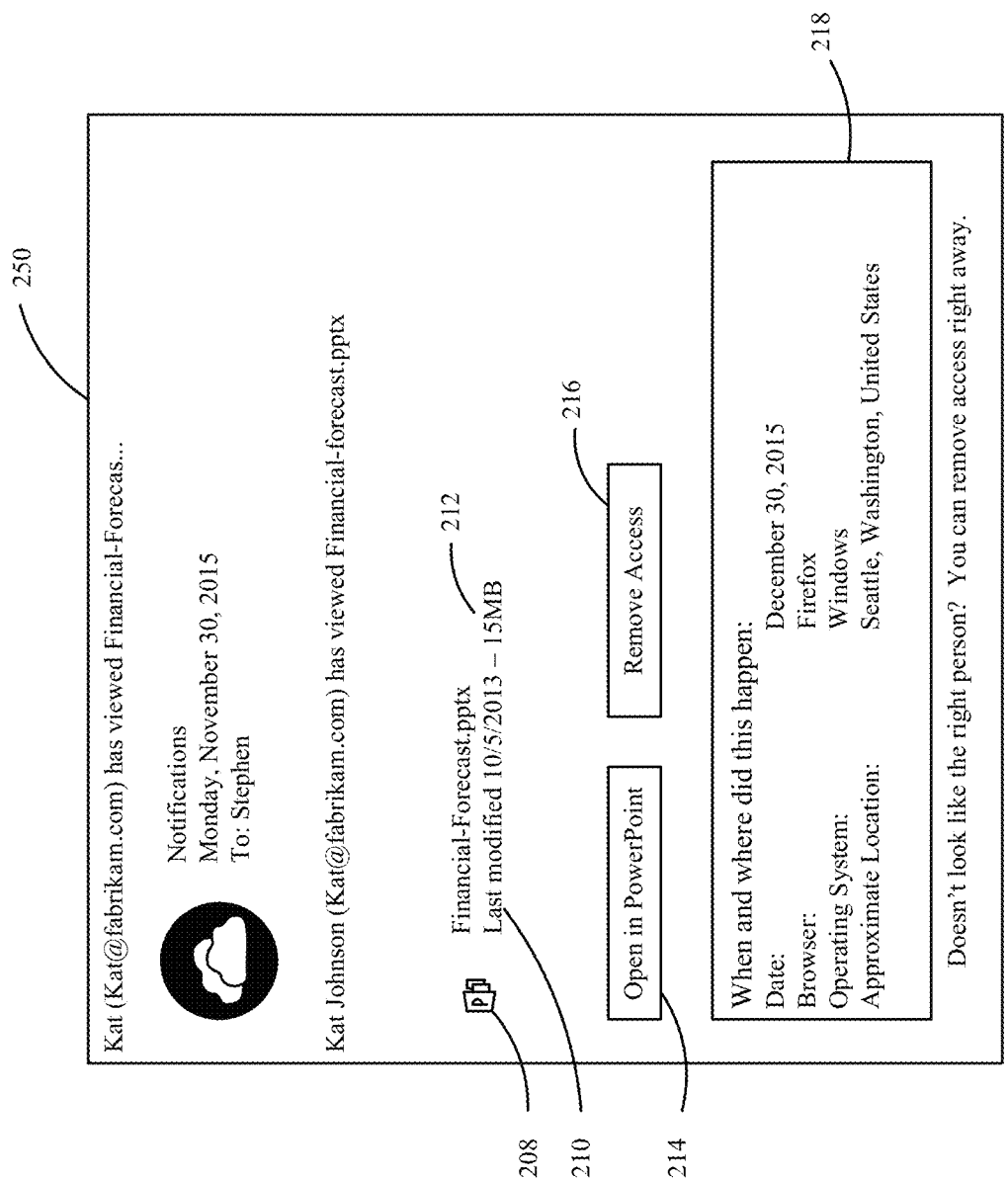
FIG. 5 is a diagrammatic view of a notification sent to an owner of a document shared by a first user with a second user in accordance with one embodiment.

FIG. 5 is a diagrammatic view of a notification provided to an owner or responsible party relative to a re-shared electronic file in accordance with one embodiment. Notification 250 includes a title or a heading indicating that the recipient of the re-sharing invitation (Kat) has viewed the re-shared document Financial-forecast.pptx. As with notification 200, notification 250 includes summary aspects 208, 210, and 212, providing the owner/responsible party with a brief summary of the re-shared electronic file. Further still, the owner/responsible party is also provided with one or more user interface controls or links 214, 216 that allow the owner/responsible party to immediately take one or more actions with respect to the electronic file and/or access. Specifically, the owner/responsible party may open the re-shared file using an appropriate application. The owner/responsible party may revoke or otherwise remove access to the re-shared electronic file by engaging control 216. Notification 250 also includes a context portion 218 that provides the context of the viewing operation with respect to the re-shared file. In the example shown in FIG. 5, the context of the viewing of the re-shared electronic file indicates that Kat viewed the Financial-forecast.pptx file on Dec. 30, 2015. Further, Kat was employing a browser entitled "Firefox" and using the Windows operating system. Further still, context portion 218 indicates that Kat was in the approximate location of Seattle, Wash., in the United States. This information may be helpful to the responsible party (Stephen). For example, Stephen may know that the file contains export-sensitive materials and that viewing or sharing of such materials in another country may not be allowed.

Figure 6:
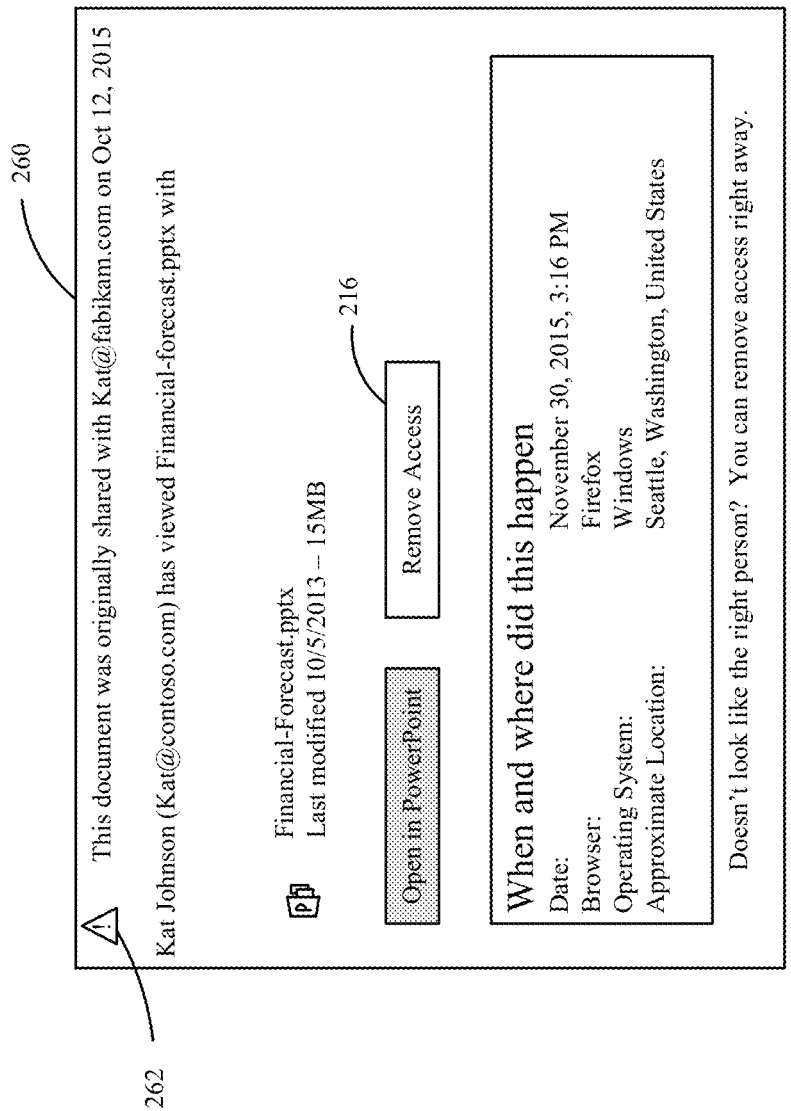
FIG. 6 is a diagrammatic view of a notification provided to a document owner in accordance with one embodiment.

FIG. 6 is a diagrammatic view of another notification that may be provided to an owner/responsible party in accordance with one embodiment. Many aspects of notification 260 are similar to those of notification 250 and will not be described separately. Notification 260 illustrates an additional warning provided to the owner/responsible party when data storage system 100 recognizes that a document originally shared with a user at a first e-mail address is viewed or otherwise accepted by the user logging in with a second or different e-mail address. In the embodiment shown in FIG. 6, message 260 includes a warning indicator 262 and a description that Financial-forecast.pptx was originally shared with kat@fabrikam.com on Oct. 12, 2015. Message 260 also indicates that kat@contoso.com viewed the re-shared document. This may be an indicator of unauthorized access. However, there may be a legitimate scenario in which Kat is using a different email address, such as Kat no longer using kat@fabrikam.com. In either case, Stephen may wish to investigate to ensure that access is proper. In the event that it is not, the owner or responsible party, Stephen, may wish to immediately remove access to Financial-forecast.pptx by Kat by selecting or otherwise engaging remove access component 216.

As can be appreciated, embodiments described herein may generate a relatively large number of electronic notifications. Further, since it is expressly contemplated that notifications to file owners/responsible parties can be provided in or using any number of messaging modalities (email, SMS, in-app notifications), embodiments herein may also allow at least some configuration of such messaging.

Figure 7:
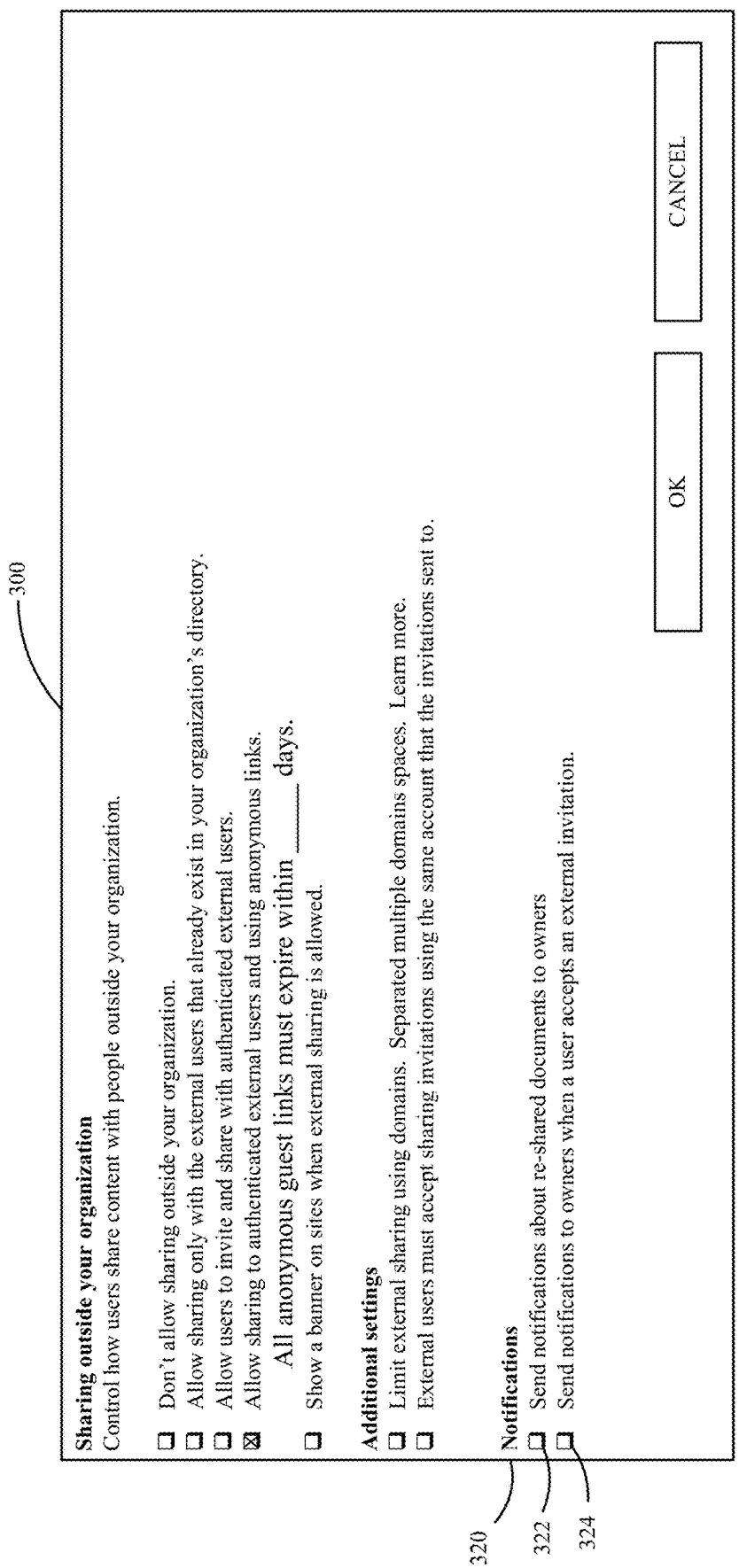
FIG. 7 is a diagrammatic view of an administrative console allowing an administrator or other responsible party to set sharing policies relatively to an organization, in accordance with one embodiment.

FIG. 7 is a diagrammatic view of an administrative console for an administrator or responsible party relative to a particular domain or organization. Console 300 includes notifications portion 320 allowing the administrator or responsible party to set notification configuration information relative to the organization. Specifically, the administrator or responsible party can decide whether or not notifications will be sent about re-shared files to owners by selecting box 322. Further, the administrator or responsible party can set whether notifications to owners will be sent when a user accepts an external invitation, as indicated at reference numeral 324.

Figure 8:
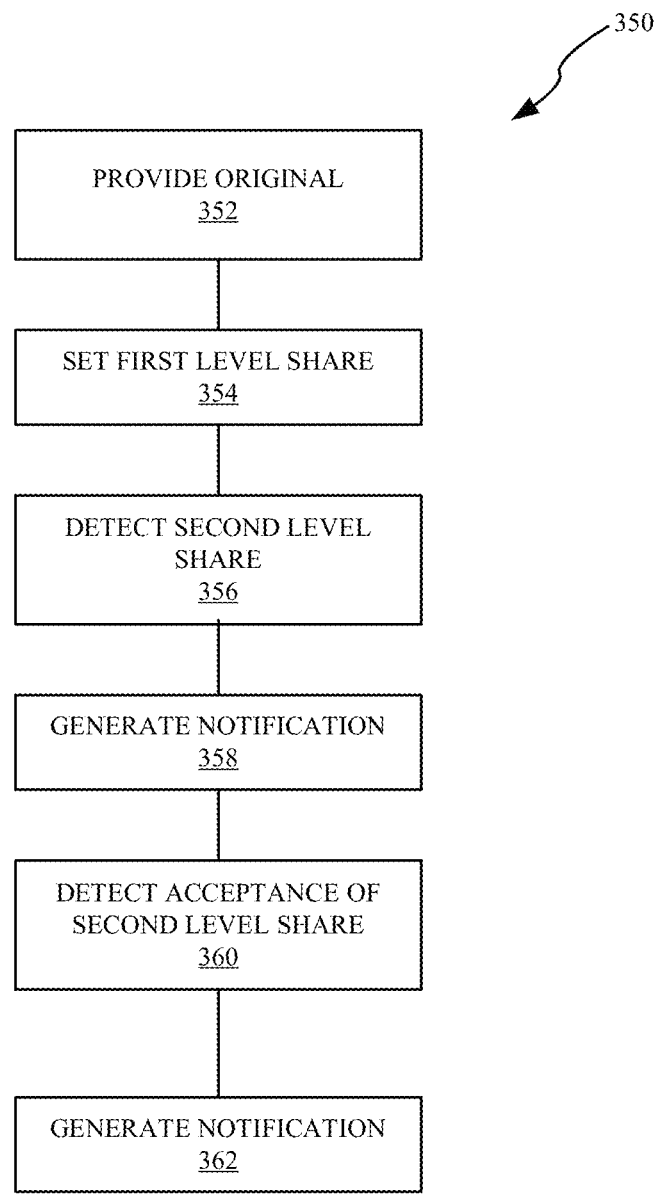
FIG. 8 is a flow diagram of a method of generating re-share notification and re-share acceptance notification in accordance with one embodiment.

FIG. 8 is a flow diagram of a method of generating notifications relative to re-sharing of electronic files in accordance with one embodiment. Method 350 begins at block 352 where an original electronic file is created or otherwise uploaded to an on-line storage provider. Next, at block 354, the owner or other responsible party of the original electronic document sets one or more first-level shares with respect to the electronic file. Examples of first-level shares are the owner or responsible party directly sharing the file with one or more other users. At block 356, the on-line data storage provider detects that one or more of the users with whom the owner/responsible party has shared access to the electronic file has re-shared the electronic file. This re-sharing may be with respect to additional users within the same organization as the user and/or with respect to one or more external users. Further, the notification generated relative to the detected second-level share can provide an indication whether the second-level share included any external users. The generation of the notification with respect to the second-level share is indicated at block 358. When one or more of the recipients of the invitation for the second-level share accepts the invitation, such acceptance is detected at block 360. This means that the user that has accepted the second-level share now has access to the electronic file. Method 350 automatically generates a notification to the owner/responsible party for the electronic file, as indicated at block 362.

The notification(s) provided at blocks 358 and/or 362 can be to more than one responsible party. Further still, it is also contemplated that a notification to a given owner or responsible party can be redundant. Thus, an owner of a re-shared electronic file may receive an e-mail, SMS alert, and notification surfaced within an application on the user's mobile device all indicative of the re-share. This ensures that the notification will receive the owner/responsible party's attention as quickly as possible and thus allow the owner/responsible party to take action, if necessary, quickly.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
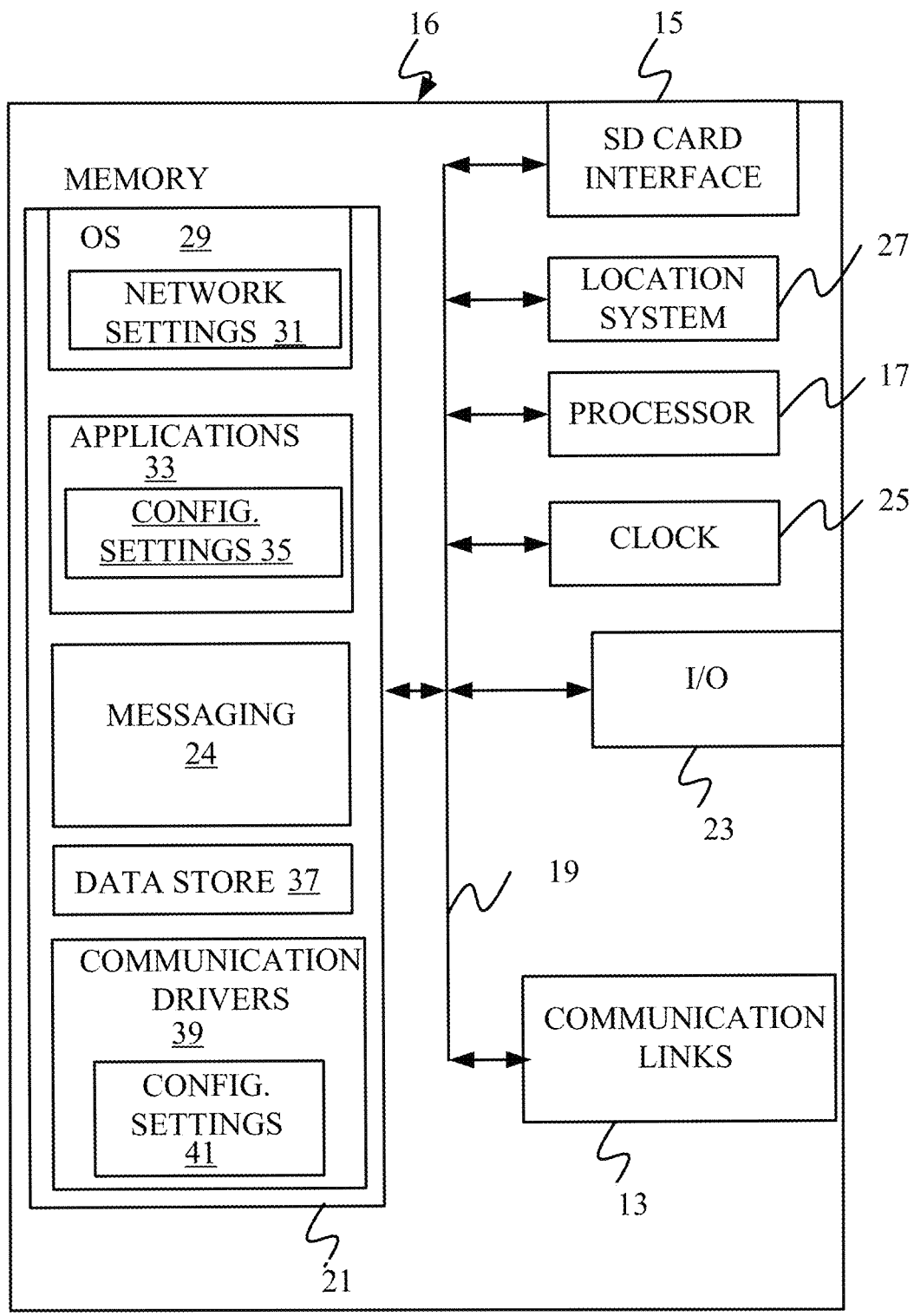
FIG. 9 provides a general block diagram of the components of a client device that can run components of the data storage system to interact with the data storage system.
Figure 10:
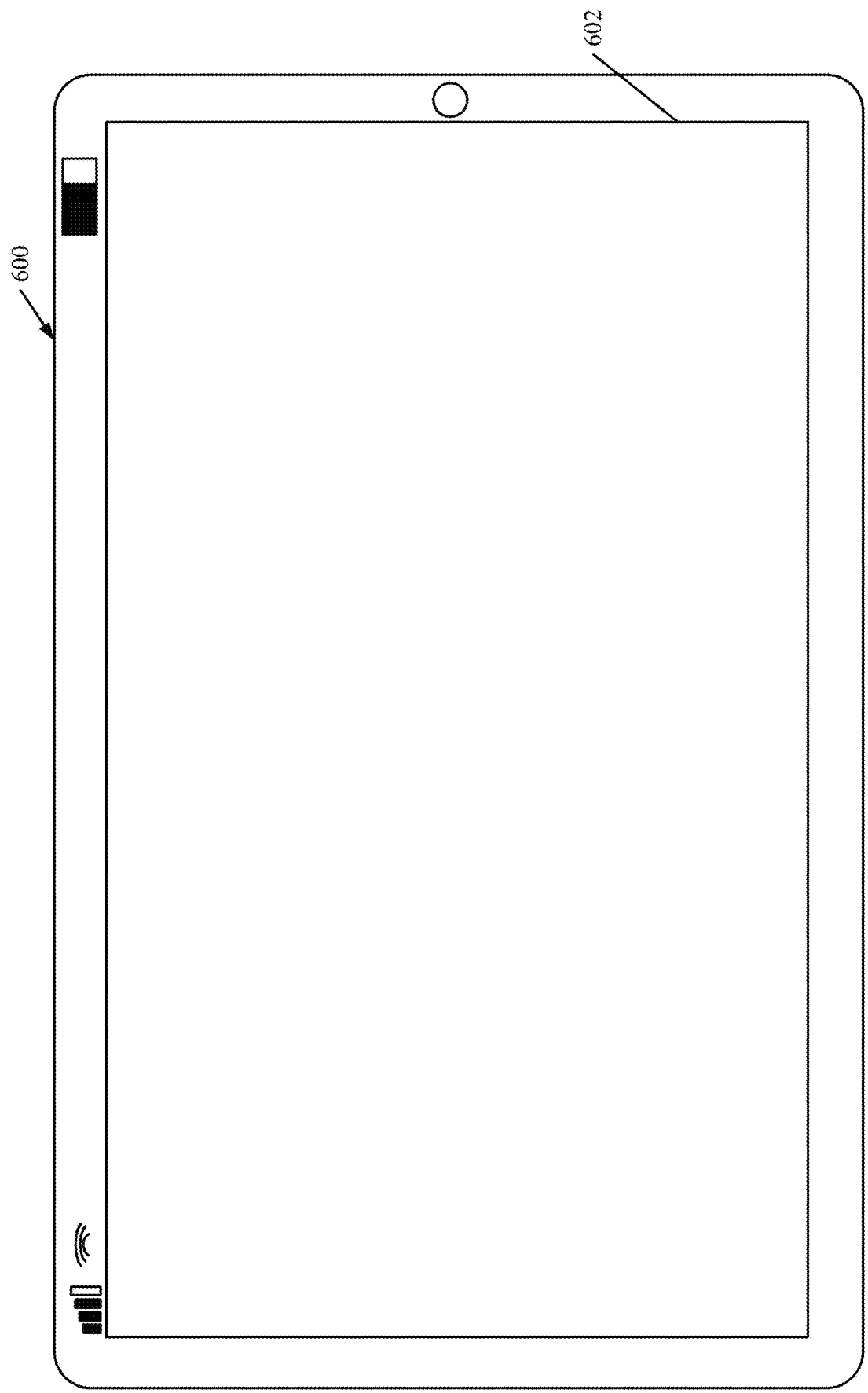
FIGS. 10 and 11 are diagrammatic views client devices that can run components of the data storage system to interact with the data storage system.
Figure 11:
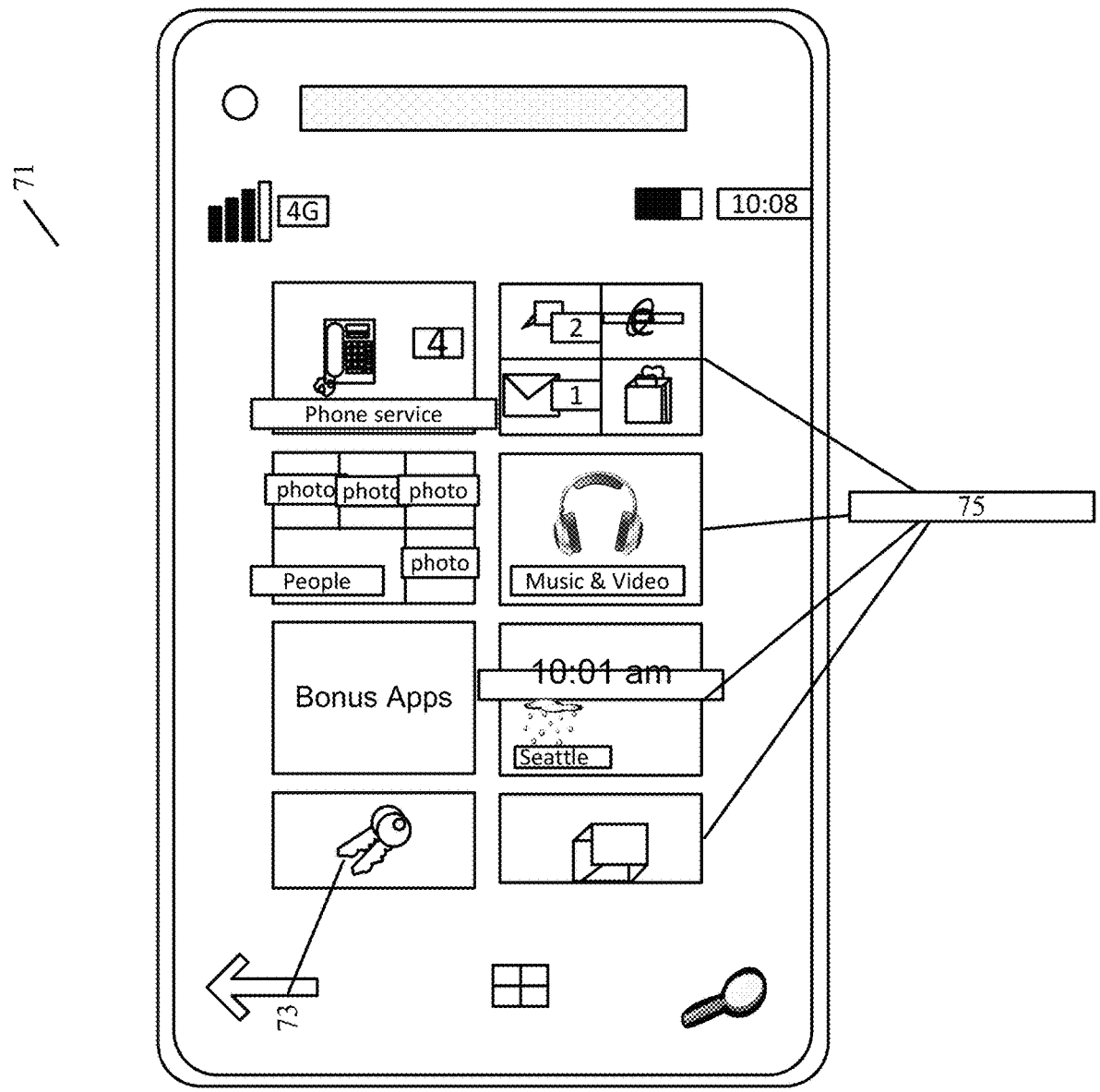

FIG. 9 is a simplified block diagram of one illustrative embodiment of a handheld or mobile computing device that can be used as a user's or client's hand held device 16, in which the present system (or parts of it) can be deployed. FIGS. 10 and 11 are examples of handheld or mobile devices.

FIG. 9 provides a general block diagram of the components of a client device 16 that can run components of data storage system 100 or that interacts with system 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems (like messaging application 24) are received on a removable Secure Digital (SD) card that is connected to a SD card interface 15. SD card interface 15 and communication links 13 communicate with a processor 17 along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions. This location information can provide the user's location when a shared electronic file is accessed.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Memory 21 can also store messaging application 24 in order to allow the user to send and receive electronic messages. Additionally, memory 21 can also store a dedicated application that allows the user to interact with online storage system 100.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 10 shows one embodiment in which device 16 is a tablet computer 600. In FIG. 10, computer 600 is shown with display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be, a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1xrtt, and Short Message Service (SMS) signals. In some examples the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can also include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 11 is a diagrammatic view of another mobile device in which embodiments described herein are particularly useful. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone. Note that other forms of the devices 16 are possible.

Figure 12:
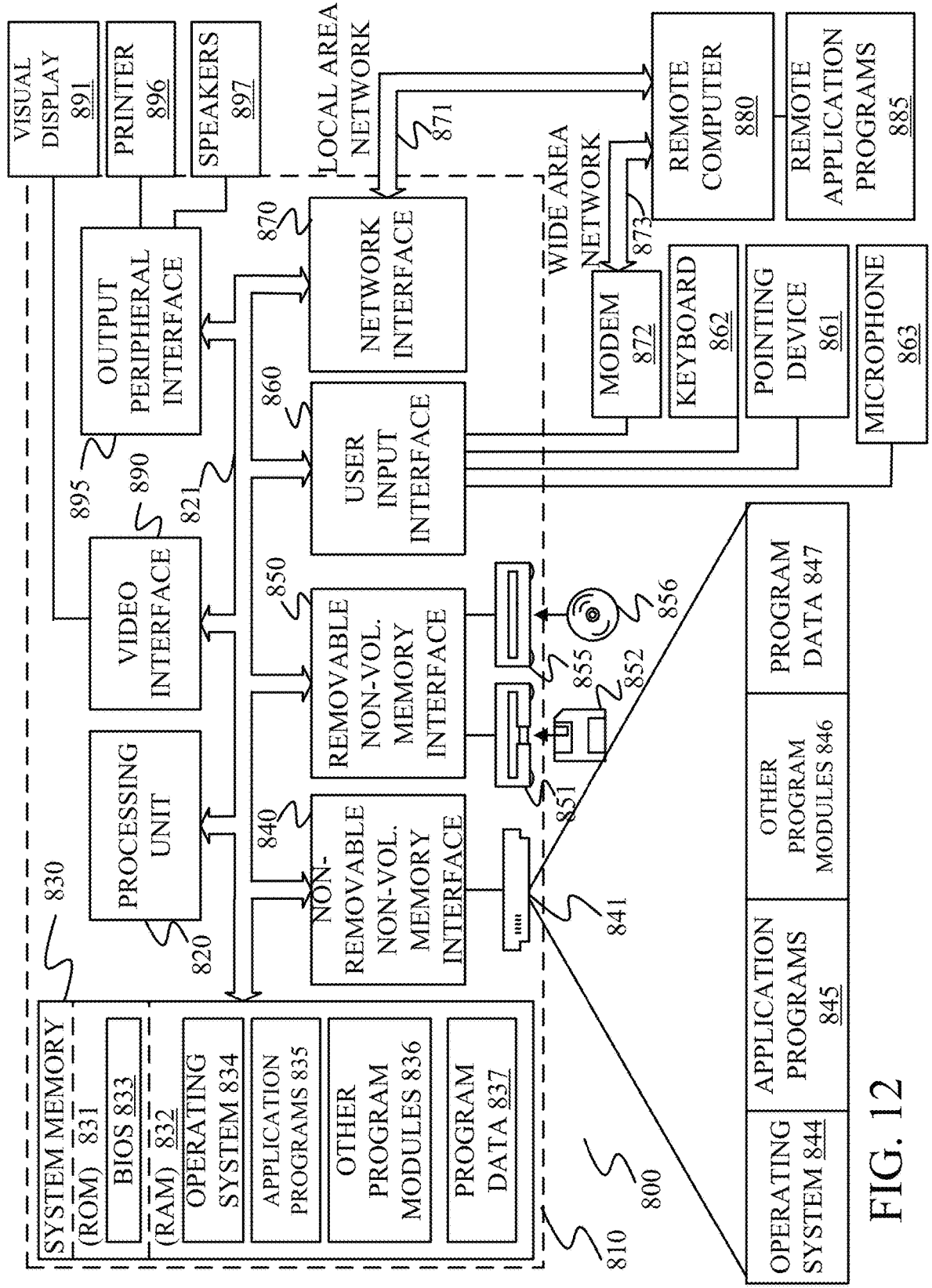
FIG. 12 is a general block diagram of a computing device that can run components of a data access system or client device that interacts with the data access system, or both.

FIG. 12 is one embodiment of a computing environment in which architecture 100, or parts of it, (for example) can be deployed. With reference to FIG. 12, an exemplary system for implementing some embodiments includes a general-purpose computing device in the form of a computer 810. Components of computer 810 may include, but are not limited to, a processing unit 820, system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 12 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system providing access to electronic files is provided. The computing system includes a processor and a data store coupled to the processor and configured to store the electronic files. A user interface component is coupled to the processor and is configured to generate a user interface that allows a first user to select an electronic file to be re-shared with second user. The processor is configured to detect re-sharing of the selected electronic file by the first user and automatically generate a notification to a third user. The notification is configured to allow the third user to cancel the re-sharing of the electronic file.

Example 2 is the computing system of any or all previous examples wherein the third user is an owner of the selected electronic file.

Example 3 is the computing system of any or all previous examples wherein the third user is a party that is responsible for the selected electronic file.

Example 4 is the computing system of any or all previous examples and further comprising a messaging component configured to automatically compose and send the notification to the third user.

Example 5 is the computing system of any or all previous examples wherein the messaging component is configured to compose the notification to identify the electronic file and the identity of the second user.

Example 6 is the computing system of any or all previous examples wherein the second user is an external user.

Example 7 is the computing system of any or all previous examples wherein the messaging component is configured to compose the notification to identify the first user.

Example 8 is the computing system of any or all previous examples wherein the messaging system is configured to compose the notification to include context information relative to re-sharing the selected electronic file.

Example 9 is the computing system of any or all previous examples wherein the messaging system is configured to compose the notification to include at least one control that, when actuated, opens the selected file.

Example 10 is the computing system of any or all previous examples wherein the messaging system is configured to compose the notification to include at least one control that, when actuated, revokes access by the third user to the selected file.

Example 11 is a computing system configured to provide access to electronic files. The computing system includes a processor and a data store coupled to the processor and configured to store the electronic files. The processor is configured to use an access control component to detect a first user accepting a re-sharing invitation from a second user relative to an electronic file. The processor is configured to automatically generate a notification to a third user, which notification is configured to allow the third user to cancel the re-sharing of the electronic file.

Example 12 is the computing system of any or all previous examples wherein the third user is a party that is responsible for the electronic file.

Example 13 is the computing system of any or all previous examples and further comprising a messaging component configured to automatically compose and send the notification to the third user.

Example 14 is the computing system of any or all previous examples wherein the messaging component is configured to compose and transmit the notification using at least one of the modalities selected from the group consisting of email, short message service, and in-application notifications.

Example 15 is the computing system of any or all previous examples wherein the messaging component is configured to compose the notification to include context information relative to the electronic file.

Example 16 is the computing system of any or all previous examples wherein the context information includes a date on which the electronic file was last modified.

Example 17 is the computing system of any or all previous examples wherein the context information includes a location of the first user.

Example 18 is the computing system of any or all previous examples wherein the context information includes information indicative of a computing environment of the first user.

Example 19 is a computer-implemented method of providing electronic storage of files. The method includes receiving an electronic file from a first user. First-level share information is received from the first user that identifies a second user, with whom the first user has shared the electronic file. A user interface is provided to the second user that receives an identification of a third user for a second-level share for the electronic file. An electronic invitation to share the electronic file is provided to the third user, wherein upon acceptance, the third user has access to the electronic file. A notification is generated to the first user when the third user has accepted the electronic notification to share the electronic file.

Example 18 is the computer-implemented method of any or all of previous examples wherein providing the electronic notification to the third user occurs after generation of the notification to the first user.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system configured to provide access to electronic files, the system comprising:
   a processor;
   memory coupled to the processor and containing instructions that when executed provide a data store;
   the data store being configured to store the electronic files; and
   wherein the processor is configured to detect re-sharing of an electronic file by a user and automatically compose a re-sharing invitation and automatically compose and send a re-sharing notification, wherein the re-sharing notification includes a user interface element that, when actuated by a party that is responsible for the electronic file, causes the processor to cancel the re-sharing invitation of the electronic file, the processor being configured to hold the re-sharing invitation until after sending the re-sharing notification.

2. The computing system of claim 1, wherein the party that is responsible for the selected electronic file is an owner of the selected electronic file.

3. The computing system of claim 1, wherein a messaging component is configured to compose the notification to identify the electronic file and an identity of a recipient of a re-share invitation.

4. The computing system of claim 3, wherein the recipient is an external user.

5. The computing system of claim 3, wherein the messaging component is configured to compose the notification to identify a re-sharer of the electronic file.

6. The computing system of claim 3, wherein the messaging component is configured to compose the notification to include context information relative to re-sharing the electronic file.

7. The computing system of claim 3, wherein the messaging component is configured to compose the notification to include at least one control that, when actuated, opens the electronic file.

8. The computing system of claim 3, wherein the messaging component is configured to compose the notification to include at least one control that, when actuated, revokes access to the electronic file for the recipient of the re-share invitation.

9. The computing system of claim 1, and further comprising a messaging component configured to automatically compose and send the re-sharing notification.

10. The computing system of claim 9, wherein the messaging component is configured to compose and transmit the notification using at least one of the modalities selected from the group consisting of email, short message service, and in-application notifications.

11. The computing system of claim 10, wherein the messaging component is configured to compose the notification to include context information relative to the electronic file.

12. The computing system of claim 11, wherein the context information includes a date on which the electronic file was last modified.

13. The computing system of claim 1, wherein the processor is configured to hold the re-sharing invitation for five minutes after the re-sharing notification is sent to the party that is responsible for the electronic file.

14. A computer-implemented method of providing electronic storage of files, the method comprising:
   receiving an electronic file from a first user;
   receiving first-level share information from the first user that identifies a second user, with whom the first user has shared the electronic file;
   receiving, from the second user, an identification of a third user for a second-level share for the electronic file;
   providing an electronic invitation to share the electronic file to the third user, wherein upon acceptance by the third user, grants the third user access to the electronic file; and
   composing and sending a notification to the first user wherein the notification is configured to allow the first user to cancel the second-level share to the third user; and
   wherein providing the electronic invitation to the third user occurs after sending the notification to the first user.

* * * * *